(12) United States Patent
Wang

(10) Patent No.: US 9,442,261 B2
(45) Date of Patent: Sep. 13, 2016

(54) DEVICES FOR COUPLING A LIGHT-EMITTING COMPONENT AND A PHOTOSENSING COMPONENT

(71) Applicant: Toshiba Medical Systems Corporation, Otawara-shi (JP)

(72) Inventor: Jerry Wang, Lake Zurich, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 14/326,923

(22) Filed: Jul. 9, 2014

(65) Prior Publication Data

US 2016/0011388 A1     Jan. 14, 2016

(51) Int. Cl.
| | |
|---|---|
| G01T 1/24 | (2006.01) |
| G02B 6/42 | (2006.01) |
| G01T 1/20 | (2006.01) |
| G01T 1/16 | (2006.01) |
| B82B 3/00 | (2006.01) |

(52) U.S. Cl.
CPC .............. *G02B 6/4298* (2013.01); *G01T 1/16* (2013.01); *G01T 1/2018* (2013.01); *B82B 3/008* (2013.01); *Y10S 977/834* (2013.01); *Y10S 977/954* (2013.01)

(58) Field of Classification Search
CPC ................................. G01T 1/24; G01T 1/161
USPC ...................... 250/252.1, 369, 366
See application file for complete search history.

(56) References Cited

U.S. PATENT DOCUMENTS

| | | | | |
|---|---|---|---|---|
| 7,214,947 | B2 * | 5/2007 | Bueno et al. ............. | 250/370.11 |
| 7,547,888 | B2 * | 6/2009 | Cooke et al. ............. | 250/361 R |
| 7,608,829 | B2 * | 10/2009 | Loureiro et al. .......... | 250/361 R |
| 7,625,502 | B2 * | 12/2009 | Clothier et al. ........ | 252/301.4 H |

(Continued)

FOREIGN PATENT DOCUMENTS

| | | |
|---|---|---|
| JP | 2013-113685 A | 6/2013 |
| JP | 2014-32029 A | 2/2014 |

OTHER PUBLICATIONS

Kambe et al. Refractive Index Engineering of Nano-Polymer Composites ,Mat. Res. Soc. Symp. Proc. vol. 676 © 2001 Materials Research Society.*

*Primary Examiner* — David Porta
*Assistant Examiner* — Djura Malevic
(74) *Attorney, Agent, or Firm* — Oblon, McClelland, Maier & Neustadt, L.L.P.

(57) ABSTRACT

A radiation detector is provided including a photosensor, a scintillator, and a light guide arranged between the scintillator and the photosensor and configured to guide light from the scintillator to the photosensor, the light guide including a nano-composite that includes nanoparticles that determine a refractive index of the nano-composite. The nano-composite includes a polymer material and the nano-particles, wherein the nano-particles are uniformly distributed throughout the polymer material so that the refractive index of the nano-composite is uniform throughout the nano-composite. Alternatively, the nano-particles are distributed throughout the polymer material so that the refractive index of the nano-composite is equal to the refractive index of the photosensor at a first boundary of the nano-composite that contacts the photosensor, is equal to the refractive index of the scintillator at a second boundary of the nano-composite that contacts the scintillator, and varies uniformly throughout the nano-composite between the first and second boundaries.

5 Claims, 2 Drawing Sheets

(56) References Cited

U.S. PATENT DOCUMENTS

| | | | |
|---|---|---|---|
| 7,708,968 B2* | 5/2010 | Clothier et al. | 423/263 |
| 7,857,993 B2* | 12/2010 | Dai et al. | 252/301.17 |
| 8,236,200 B2* | 8/2012 | Sweeney et al. | 252/301.4 R |
| 8,536,532 B1* | 9/2013 | Kross et al. | 250/361 R |
| 8,796,631 B2* | 8/2014 | Penumadu et al. | 250/362 |
| 8,882,327 B2* | 11/2014 | Greener et al. | 362/627 |
| 8,895,652 B2* | 11/2014 | Agrawal et al. | 524/430 |
| 9,008,472 B2* | 4/2015 | Chang et al. | 385/31 |
| 2002/0079455 A1* | 6/2002 | Wieczorek | 250/367 |
| 2003/0021566 A1* | 1/2003 | Shustack et al. | 385/129 |
| 2004/0233526 A1* | 11/2004 | Kaminsky et al. | 359/452 |
| 2006/0231797 A1* | 10/2006 | Riman et al. | 252/301.4 H |
| 2006/0273258 A1* | 12/2006 | Kastalsky et al. | 250/370.11 |
| 2007/0085010 A1* | 4/2007 | Letant et al. | 250/361 R |
| 2008/0093557 A1* | 4/2008 | Cooke et al. | 250/361 R |
| 2008/0128624 A1* | 6/2008 | Cooke et al. | 250/361 R |
| 2008/0237470 A1* | 10/2008 | Loureiro et al. | 250/361 R |
| 2008/0241040 A1* | 10/2008 | Clothier et al. | 423/263 |
| 2008/0241041 A1* | 10/2008 | Clothier et al. | 423/263 |
| 2008/0311380 A1* | 12/2008 | Agrawal | 428/323 |
| 2009/0209420 A1* | 8/2009 | Kalgutkar et al. | 503/201 |
| 2009/0283720 A1* | 11/2009 | Sweeney et al. | 252/301.4 F |
| 2010/0044640 A1* | 2/2010 | Agrawal et al. | 252/301.36 |
| 2010/0270462 A1* | 10/2010 | Nelson et al. | 250/252.1 |
| 2012/0140513 A1* | 6/2012 | Shibata et al. | 362/602 |
| 2012/0312970 A1* | 12/2012 | Goebel et al. | 250/216 |
| 2013/0134312 A1 | 5/2013 | Nagano et al. | |
| 2014/0056555 A1* | 2/2014 | Chang et al. | 385/31 |
| 2014/0092632 A1* | 4/2014 | Greener et al. | 362/627 |
| 2014/0093650 A1* | 4/2014 | Greener et al. | 427/510 |

\* cited by examiner

DEVICES FOR COUPLING A LIGHT-EMITTING COMPONENT AND A PHOTOSENSING COMPONENT

FIELD

Embodiments disclosed herein generally relate to coupling light-emitting components and photo-sensing components using nano-composites.

BACKGROUND

In order to get high quality CT or PET (Positron Emission Tomography) images, detectors with good properties are required. Conventionally, the refractive index of the coupling material between a light-emitting component, such as scintillator, and a photosensor, such as a photomultiplier tube (PMT), is smaller than the ideal or desired index. Also, since the material composition is uniform, the refractive index throughout the coupling region is uniform. Due to the refractive index mismatch between the light-emitting component and the photosensor, some of the scintillation light needs a relatively long time to get out of the scintillator, and some of scintillation light is trapped and lost in the scintillator. As a result, the number of photons detected by the photosensor is not as high as it should be, and photons do not reach the detector as fast as they should. This degrades the energy resolution and timing resolution of the detector. Traditionally, the light-emitting part and the photosensor are coupled with a material having a preset refractive index, which is not optimized to reduce light loss for each particular scanning application.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

With conventional PET scanners, it is hard to identify small lesions and to scan large patients. Thus, the embodiments disclosed herein improve energy resolution and timing resolution of radiation detectors, and thus improve, e.g., PET image quality.

According to one embodiment, there is provided a radiation detector, comprising: (1) a photosensor; (2) a scintillator; and (3) a light guide arranged between the scintillator and the photosensor and configured to guide light from the scintillator to the photosensor, the light guide comprising a nano-composite that includes nano-particles that determine a refractive index of the nano-composite.

In one embodiment, the nano-composite includes a polymer material and the nano-particles, wherein the nano-particles are uniformly distributed throughout the polymer material so that the refractive index of the nano-composite is uniform throughout the nano-composite. In particular, the refractive index of the nano-composite is substantially equal to the geometric mean of the refractive index of the scintillator and the refractive index of the photosensor.

In another embodiment, the nano-composite includes a polymer material and the nano-particles, wherein the nano-particles are distributed throughout the polymer material so that the refractive index of the nano-composite is equal to the refractive index of the photosensor at a first boundary of the nano-composite that contacts the photosensor, is equal to the refractive index of the scintillator at a second boundary of the nano-composite that contacts the scintillator, and varies uniformly throughout the nano-composite between the first and second boundaries.

In another embodiment, an average particle size of the nano-particles is less than 50 nm.

In another embodiment, a primer is provided to strengthen a bond between the nano-composite and the photosensor.

Figures 1A, 1B:
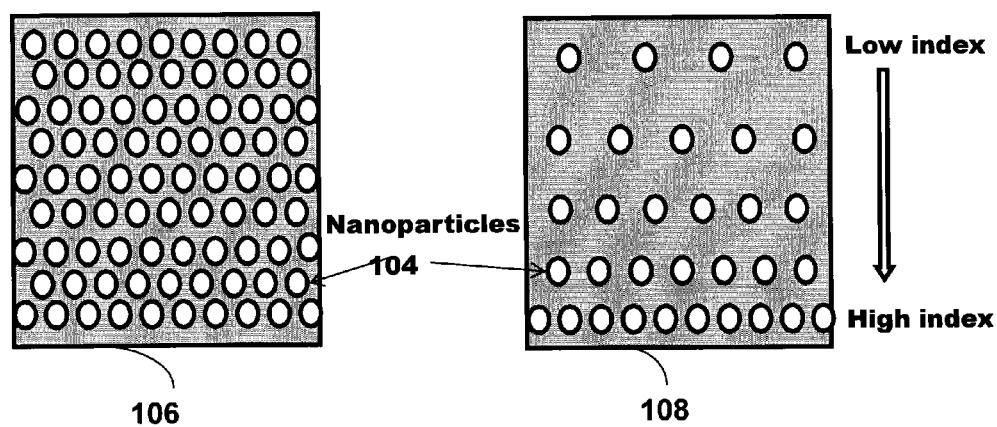
FIGS. 1A and 1B illustrate examples of coupling materials.

Referring now to the drawings, wherein like reference numerals designate identical or corresponding parts throughout the several views, FIG. 1A illustrates an example of a coupling material including a nano-composite material 106 having a uniform refractive index, while FIG. 1B illustrates a coupling material including a nano-composite material 108 having a varying (gradient) refractive index.

According to one embodiment, the nano-composite material includes a polymer matrix and a plurality of nanoparticles 104 of a predetermined material having a high refractive index, for example, larger than 2.0. The embodiments of FIGS. 1A and 1B, which have a uniform and a gradient index, respectively, are obtained by controlling the doping level of the plurality of nanoparticles.

According to one embodiment, to reduce light loss, the uniform index of the coupling material of FIG. 1A is designed to be the geometric mean of the refractive indices of the scintillator and the photosensor. Similarly, the coupling material in FIG. 1B is designed so that the refractive index at either end matches the refractive indices of the contacting photosensor and scintillator, respectively.

In each embodiment, the nano-composite can be obtained by mixing a polymer with a plurality of nanoparticles 104. The nanoparticles 104 are made from a material with a high refractive index. In order to properly disperse the nanoparticles 104 into the matrix, the surface of the particles can be treated.

In another embodiment, the nano-composite can be made via an in-situ sol-gel process. The size of the nanoparticles 104 can be controlled by optimizing the process parameters.

During detector assembly, a gap between the scintillator and the photosensor is filled with the uncured nanocomposite coupling material. The material is later cured so that the two components, i.e., the photosensor and the scintillator, are bonded together. A primer can also be used to strengthen the bonding between the photosensor and the scintillator.

As shown in FIG. 1B, the density of the nanoparticles 104 in a particular region determines the refractive index of the nano-composite in that region. Thus, a low density of nanoparticles 104 results in a low refractive index of the nano-composite. To obtain the gradient refractive index of FIG. 1B, a doping level, the viscosity of a polymer matrix, and the curing time can be varied to obtain optimal results.

According to the present embodiments, the refractive index of the nano-composite is controlled to better match the indices of the other components. In one embodiment, the refractive index of the nano-composite is the geometric mean of the refractive indices of the scintillator and the photosensor, while in another embodiment, the nano-composite has a varying (gradient) refractive index that matches the refractive index of the components at the respective contact surfaces. As a result, the optical loss is reduced, light quickly exits the scintillator, and the detector performance is improved.

Figure 2A:
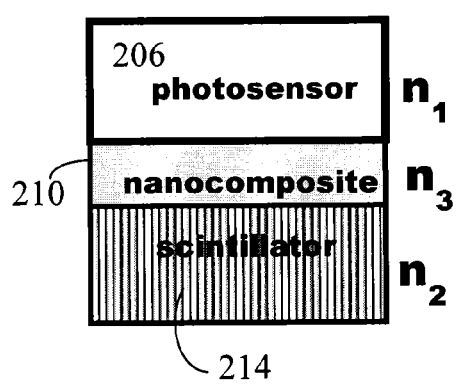
FIGS. 2A and 2B illustrate radiation detectors including a photosensor, a scintillator, and the coupling materials shown in FIGS. 1A and 1B, respectively.
Figure 2B:
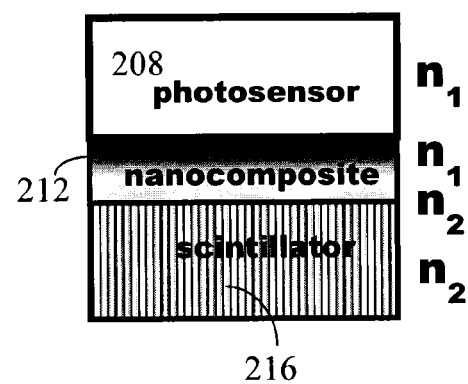

FIGS. 2A and 2B each illustrate a radiation detector including a photosensor and a scintillator array. FIG. 2A shows a detector including a nano-composite 210 having a uniform refractive index $n_3$ and coupled to a photosensor 206, having a refractive index $n_1$, and a scintillator 214, having a refractive index $n_2$. The uniform refractive index $n_3$ of the nano-composite 210 is, for example, as close as possible to the geometric mean of the refractive indices of the photosensor 206 and the scintillator 214, i.e., $n_3 = (n_1 * n_2)^{0.5}$. Generally, $n_3$ can be set to be within 10% of the geometric mean value $(n_1 * n_2)^{0.5}$. Other combinations of $n_1$ and $n_2$ can be used for $n_3$.

FIG. 2B shows a detector coupled by a nano-composite 212 having a gradient index, wherein the index varies across the nano-composite to match the refractive index at each contact surface. Thus, in this embodiment, the nano-composite 212 couples the photosensor 208, having a refractive index $n_1$, with the scintillator 216, having a refractive index $n_2$, and the refractive index of the nano-composite 212 varies uniformly from a value of $n_1$ at the surface of the photosensor to a value of $n_2$ at the surface of the scintillator.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A radiation detector, comprising:
a photosensor;
a scintillator; and
a light guide arranged between the scintillator and the photosensor and configured to guide light from the scintillator to the photosensor, the light guide comprising a nano-composite that includes nano-particles that determine a refractive index of the nano-composite, wherein the refractive index of the nano-composite is substantially equal to the geometric mean of a refractive index of the scintillator and a refractive index of the photosensor.

2. The radiation detector of claim 1, wherein nano-composite includes a polymer material and the nano-particles, wherein the nano-particles are uniformly distributed throughout the polymer material so that the refractive index of the nano-composite is uniform throughout the nano-composite.

3. The radiation detector of claim 1, wherein an average particle size of the nano-particles is less than 50 nm.

4. The radiation detector of claim 1, further comprising a primer to strengthen a bond between the nano-composite and the photosensor, and a primer to strengthen a bond between the nano-composite and the scintillator.

5. A radiation detector, comprising:
a photosensor;
a scintillator; and
a light guide arranged between the scintillator and the photosensor and configured to guide light from the scintillator to the photosensor, the light guide comprising a nano-composite that includes nano-particles that determine a refractive index of the nano-composite,
wherein the nano-composite includes a polymer material and the nano-particles, wherein the nano-particles are distributed throughout the polymer material so that the refractive index of the nano-composite is equal to the refractive index of the photosensor at a first boundary of the nano-composite that contacts the photosensor, is equal to the refractive index of the scintillator at a second boundary of the nano-composite that contacts the scintillator, and varies uniformly throughout the nano-composite between the first and second boundaries.

* * * * *